United States Patent [19]

Callison

[11] Patent Number: 4,774,823
[45] Date of Patent: Oct. 4, 1988

[54] TRAILER HITCH LOCK

[76] Inventor: Douglas A. Callison, 3824 Bayberry Ct., Urbandale, Iowa 50322

[21] Appl. No.: 40,281

[22] Filed: Apr. 20, 1987

[51] Int. Cl.$^4$ .................... B60D 1/06; E05B 65/12
[52] U.S. Cl. .......................................... 70/14; 70/57; 70/232; 70/258; 280/507
[58] Field of Search .............. 70/14, 232, 54–56, 70/258, 229, 34, 57; 280/507

[56] References Cited

U.S. PATENT DOCUMENTS

| 1,429,105 | 9/1922 | Rudy | 70/56 |
|---|---|---|---|
| 1,577,292 | 3/1926 | Obreiter | 70/258 |
| 2,571,349 | 10/1951 | Eckles | 70/14 |
| 3,139,291 | 6/1964 | Geresy | 70/229 |
| 3,237,969 | 3/1966 | Geresy | 280/507 |
| 3,884,055 | 5/1975 | Vuillemot | 280/507 X |
| 3,924,878 | 12/1975 | Utman et al. | 280/507 |
| 4,082,311 | 4/1978 | Hamman | 280/507 |
| 4,141,569 | 2/1979 | Dilk | 280/507 |
| 4,291,893 | 9/1981 | Hansen | 280/507 |
| 4,313,321 | 2/1982 | Wasser | 70/232 X |
| 4,380,160 | 4/1983 | Hoffman | 70/56 X |
| 4,428,596 | 1/1984 | Bell et al. | 280/507 |
| 4,538,827 | 9/1985 | Plifka | 70/14 X |
| 4,571,964 | 2/1986 | Bratzler | 280/507 X |

FOREIGN PATENT DOCUMENTS

| 8264 | 8/1901 | United Kingdom | 70/54 |
|---|---|---|---|
| 992133 | 5/1965 | United Kingdom | 280/507 |
| 1206333 | 9/1970 | United Kingdom | 70/14 |
| 2006143 | 5/1979 | United Kingdom | 280/507 |

Primary Examiner—Lloyd A. Gall
Attorney, Agent, or Firm—Kent A. Herink; G. Brian Pingel

[57] ABSTRACT

A hitch lock for disabling hitching couplers of trailer vehicles. A reversible keeper member includes a base portion and an extended portion projected forwardly from the base portion at an obtuse angle. The base portion includes an aperture through which is inserted an ear that is mounted on a tongue of the trailer vehicle near the hitching apparatus. A substantially U-shaped lock guard, including an ear-receiving aperture in the web portion thereof, is inserted over the ear adjacent the base portion. A shackle of a padlock is inserted into a throughbore aperture of the ear between the leg portions of the lock guard. The extended portion of the keeper member obstructs the hitching coupler such that a trailer vehicle attached to a tractor vehicle cannot be disattached and, when reversed, an unattached trailer vehicle cannot be attached to a trailer vehicle. The hitch lock works effectively with both ball and socket couplers and with pintle ring couplers.

11 Claims, 2 Drawing Sheets

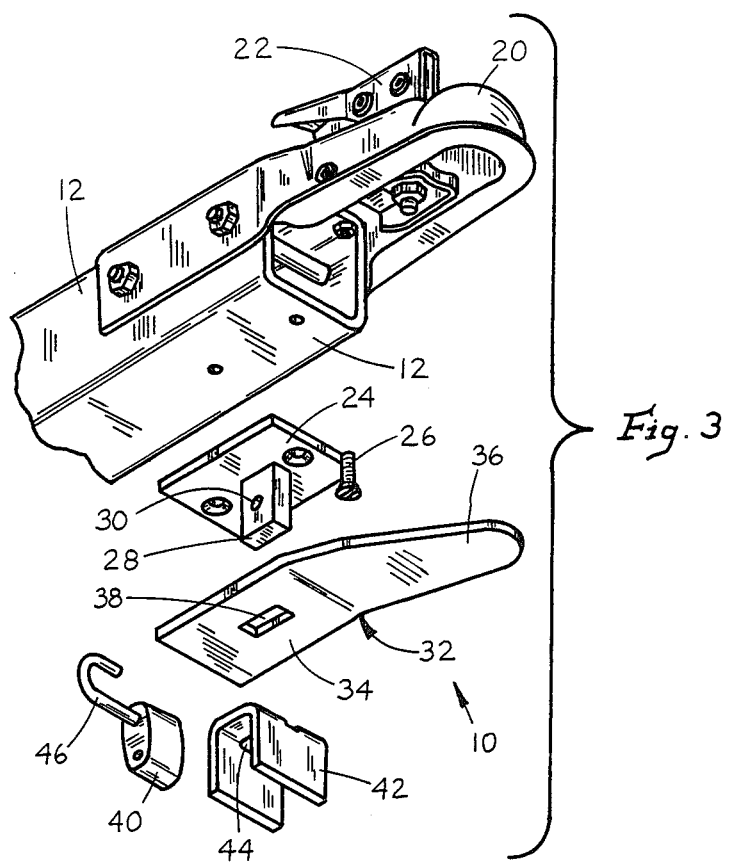
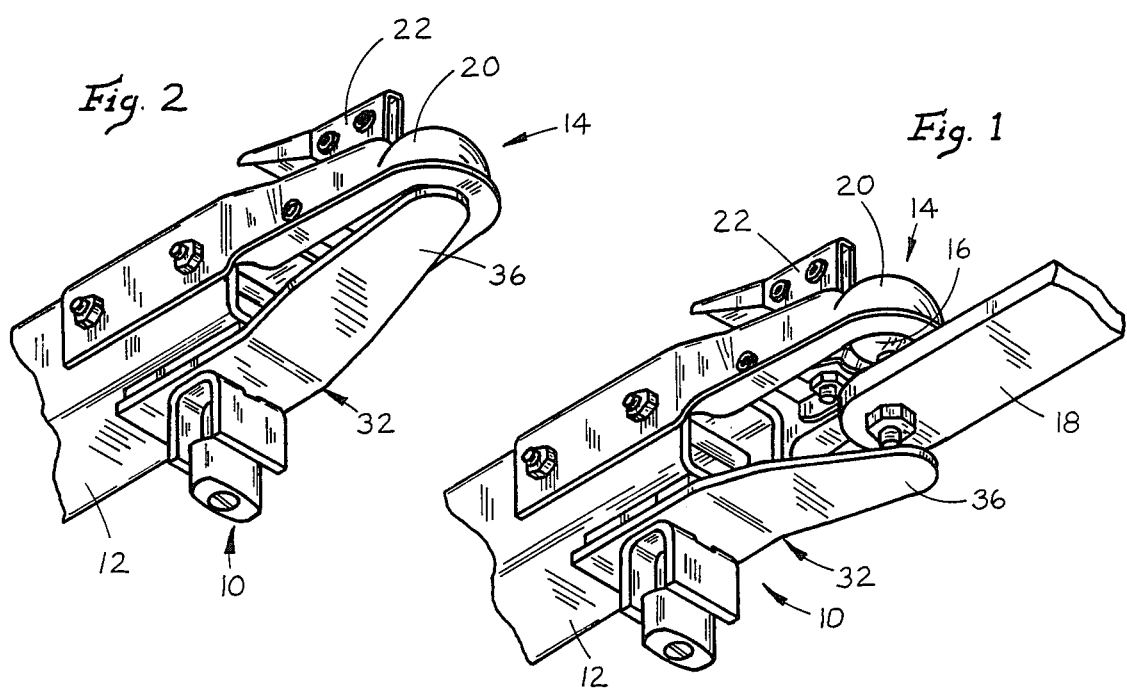
Fig. 3
Fig. 2
Fig. 1

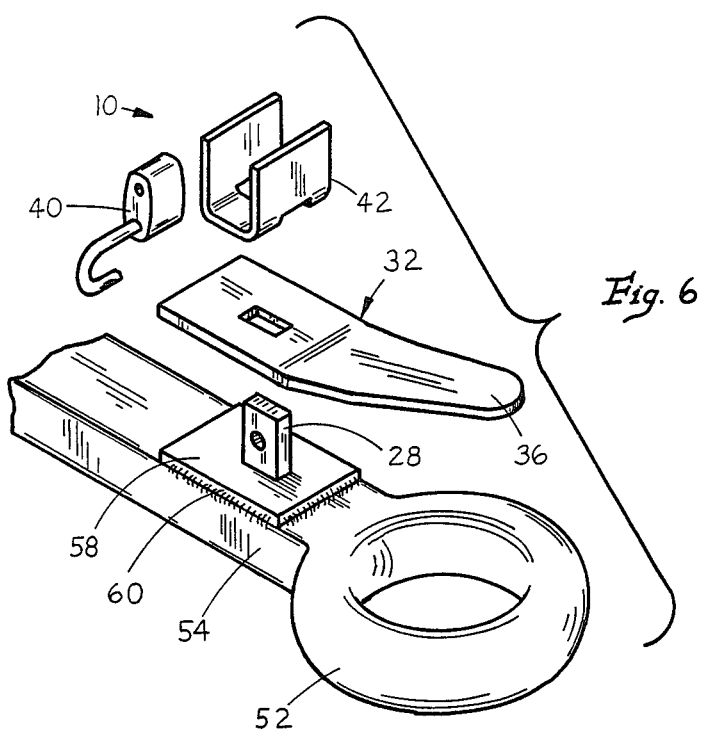
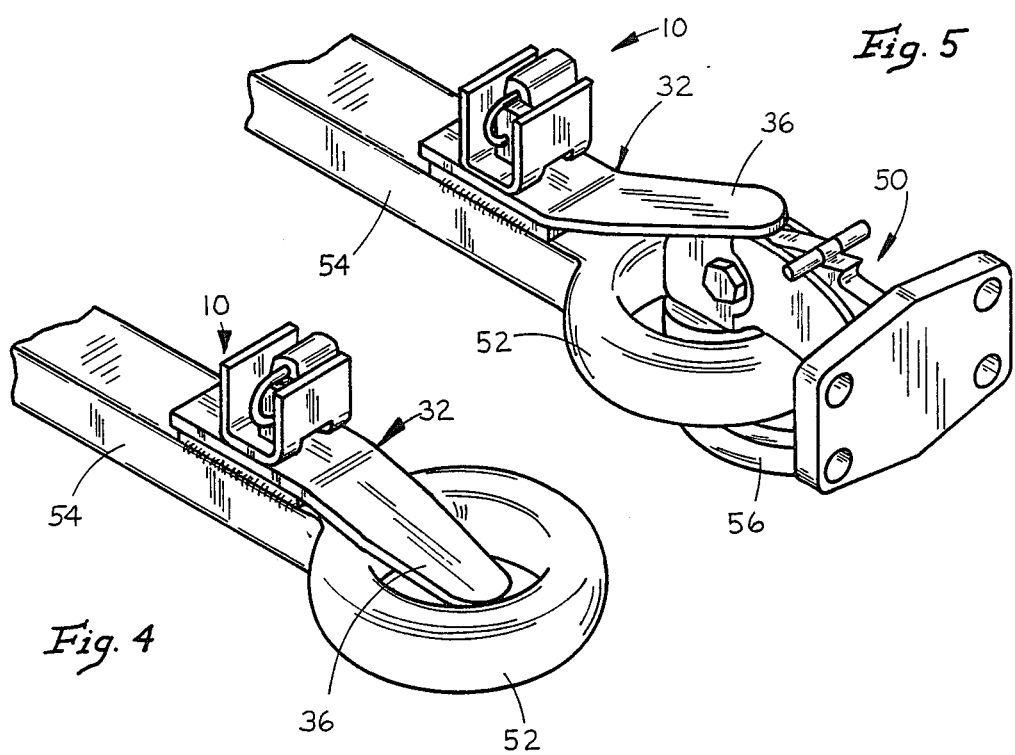

TRAILER HITCH LOCK

BACKGROUND OF THE INVENTION

The invention relates generally to anti-theft locking devices for trailer vehicles and, more specifically, to a hitch lock for disabling the hitching mechanism of a trailer vehicle to prevent the disattachment of an attached trailer vehicle and to prevent the attachment of a disattached trailer vehicle.

The theft of trailer vehicles is a widespread and troublesome problem. Trailers are commonly used to transport a wide variety of frequently valuable equipment. The inherent portability of trailers makes them easy targets for those intending to steal the articles or materials carried on the trailers.

The theft of trailers is a problem presented both to trailers which are attached to tractor vehicles and to trailers which are free or unattached to tractor vehicles. It is important, therefore, for any anti-theft device to function in both circumstances. The device, accordingly, must prevent the removal of a trailer that is attached to a tractor vehicle so that it cannot be subsequently attached and towed by thieves operating a second tractor vehicle. The device should also disable the hitching mechanism of an unattached trailer vehicle so as to prevent the attachment of a tractor vehicle operated by someone intending to steal the trailer vehicle.

The present invention provides an inexpensive and versatile hitch lock apparatus which serves to prevent the theft of both attached and unattached trailer vehicles and will function effectively on both trailer vehicles having socket and ball type hitching apparatus as well as those trailer vehicles having pintle ring hitching apparatus.

SUMMARY OF THE INVENTION

The trailer hitch lock includes a downwardly extended ear mounted on the underside of the tongue of a trailer vehicle near its hitching apparatus at the forward or terminal end portion of the tongue. A keeper member consists of a substantially flat base portion and an extended portion which projects at an obtuse angle from the base portion. The base portion includes a throughbore aperture through which the ear is inserted so as to position the base portion adjacent the underside of the tongue. The outer end portion of the ear includes a throughbore aperture into which the shackle of a padlock may be inserted. A locked padlock through such aperture will prevent the removal of the keeper member from about the ear.

For use in preventing the theft of a trailer vehicle attached to a tractor vehicle, the reversible keeper member is oriented such that the extended portion projects forwardly and downwardly so as to be below and adjacent the hitching apparatus of the trailer vehicle. The keeper member will prevent upward removal of the tongue of the trailer vehicle out of towing position on the tractor vehicle. For use in preventing the theft of a trailer vehicle that is not attached to a tractor vehicle, the reversible keeper member is oriented such that the extended portion projects forwardly and upwardly effectively to block access to the hitching apparatus of the trailer vehicle. A nonoperative, storage position is also provided for the keeper member wherein it is oriented such that the extended portion projects downwardly and rearwardly. A substantially U-shaped padlock guard has an aperture through its web portion for insertion about the ear over the base portion of the keeper member. The padlock guard permits attachment of the padlock but effectively covers the shackle of an attached padlock to limit access thereto by saws and the like which might be used to sever the shackle to remove the trailer hitch lock.

BRIEF DESCRIPTION OF THE DRAWINGS

FIG. 1 is a lower perspective view of the hitch lock on a trailer vehicle having a ball and socket hitching coupler and attached to a tractor vehicle;

FIG. 2 is a lower perspective view of the hitch lock on a trailer vehicle having a socket and ball hitching coupler that is not attached to a tractor vehicle;

FIG. 3 is an exploded view of the hitch lock and a trailer vehicle having a ball and socket hitching coupler;

FIG. 4 is an upper perspective view of the hitch lock shown attached to a trailer vehicle having a pintle ring hitching coupler and not attached to a tractor vehicle;

FIG. 5 is an upper perspective view of the hitch lock shown attached to a trailer vehicle having a pintle ring hitching coupler and shown attached to a tractor vehicle; and FIG. 6 is an exploded view of the hitch lock to be attached to a trailer vehicle having a pintle ring hitching coupler.

DETAILED DESCRIPTION OF A PREFERRED EMBODIMENT

Illustrated in FIG. 1, generally at 10, is a hitch lock mounted on the forward end portion of the tongue 12 of a conventional trailer vehicle. The trailer vehicle of FIG. 1 is provided with a ball and socket hitching coupler, illustrated generally at 14, including a towing ball 16 secured to a tongue 18 of a tractor vehicle (not shown). As is well known in the art, a socket 20 is formed in the hitching apparatus 14 into which the towing ball 16 may be inserted. Conventional hitching apparatus also include a latch 22 which clamps the socket 20 about the ball 16 to prevent unintentional disengagement of the trailer vehicle from the tractor vehicle during towing.

As best shown in FIG. 3, the hitch lock 10 includes a mounting plate 24 which is attached to the underside of the tongue 12 by bolts, one of which is illustrated at 26. An ear 28 extends downwardly from the mounting plate 24. The ear includes a throughbore or aperture 30 the axis of which is transverse to the longitudinal dimension of the ear 28.

A keeper member 32 includes a base portion 34 and an extended portion 36 which projects from said base portion at an obtuse angle thereto. The base portion 34 has an aperture 38 which corresponds to the ear 28. When the hitch lock 10 is assembled, the ear 28 extends through aperture 38 of the base portion 34 of the keeper member 32. It is to be noted that the orientation of keeper member 32 illustrated in FIG. 3 is only one of three possible orientations. As illustrated in FIG. 3, the extended portion 36 of keeper member 32 projects forwardly and downwardly with respect to the tongue 12 of the trailer vehicle. The keeper member 32 may also be reversed or turned upside-down such that the extended portion 36 projects forwardly and upwardly with respect to the tongue 12 of the trailer vehicle. The keeper member 32 as illustrated in FIG. 3 may also be rotated such that the extended portion 36 projects downwardly and rearwardly with respect to the tongue 12 of the trailer vehicle.

The hitch lock 10 is completed by a padlock 40 and a padlock guard 42. The padlock guard 42 is substantially U-shaped in transverse cross section and has a web portion that includes an aperture 44 corresponding to the aperture 38 of the base portion 34 and the ear 28. When the hitch lock 10 is assembled as illustrated in FIGS. 1 and 2, ear 28 extends through apertures 38 and 44 such that throughbore 30 is accessible between the leg portions of lock guard 42. To lock the hitch lock 10 in assembled relation, a shackle 46 of padlock 40 is inserted into throughbore 30. The lock guard 42 and padlock 40 are cooperatively dimensioned such that the body of padlock 40 may be rotated with respect to the open shackle 46 inserted through ear 28 so as to align the body and shackle to close and block padlock 40. When locked, the shackle 46 is substantially covered by the leg portions of guard 42 effectively to prevent access thereto by a saw, bolt cutters, or similar devices that might be used to remove padlock 40.

When used with a trailer vehicle having a ball and socket hitching coupler 14 as illustrated in FIG. 1, the keeper member 32 is oriented such that extended portion 36 projects forwardly and downwardly with respect to the tongue 12. In this position, the extended portion 36 is below the ball 16 and tongue 18 such that it will block vertical movement of the socket 20 that would otherwise be sufficient to disengage the trailer vehicle from the tractor vehicle. When used to secure a trailer vehicle not attached to a tractor vehicle, as illustrated in FIG. 2, the keeper member 32 is oriented such that the extended portion 36 projects forwardly and upwardly with respect to tongue 12 thereby effectively blocking or closing access to socket 20 to disable the hitching mechanism 14 so that the unattached trailer vehicle cannot be attached to a tractor vehicle. As previously explained, the hitch lock 10 may be converted from a hitch lock for attached trailer vehicles to a hitch lock for unattached trailer vehicles merely by turning upside-down the keeper member 32. Note that when assembled as illustrated in FIGS. 1 and 2, the base portion 34 of keeper member 32 prohibits access to bolts 26 of mounting plate 24 so that a potential thief could not remove the entire hitch lock mechanism 10 from the tongue 12.

As illustrated in FIGS. 4-6, the hitch lock 10 is also suitable for use with a trailer vehicle having a pintle ring hitching coupler, indicated generally at 50, and including a pintle ring 52 mounted on the forward end portion of the tongue 54 of the trailer vehicle. In towing position, as illustrated in FIG. 5, the pintle ring 52 is received about a pintle 56 of the pintle ring locking mechanism. Pintle 56 is attached to a tractor vehicle (not shown) in the conventional manner.

The elements of the hitch lock 10 for use with the pintle ring hitching coupler 50 are identical to those for use with the ball and socket hitching coupler 14 illustrated in FIGS. 1-3 except that the hitch lock is attached to the upper side of the tongue 54. An alternative mounting plate 58 is illustrated in FIGS. 4-6 wherein the mounting plate 58 is welded at 60 to tongue 54. Either method of attaching the ear 28 to the trailer vehicle may be used with either type of hitching coupler.

The function of the locking mechanism 10 when used with the pintle ring hitching coupler 50, as illustrated in FIGS. 4 and 5, is substantially identical to the function when used with the ball and socket hitching coupler 14 of FIGS. 2 and 3. When the trailer vehicle is not attached to a tractor vehicle (FIG. 4), the extended portion 36 of keeper member 32 extends forwardly and downwardly with respect to tongue 54 to block access to the pintle ring 52 so as to prevent attachment of the unattached trailer vehicle to a tractor vehicle. When the trailer vehicle is attached to a tractor vehicle, as illustrated in FIG. 5, the keeper member 32 is turned upside down such that extended portion 36 projects forwardly and upwardly with respect to tongue 54. The extended portion 36 is now positioned above and adjacent pintle 56 and will act to prevent disengagement of the pintle ring hitching coupler 50.

It should be clear from the foregoing description of the preferred embodiment that other means could be employed in accomplishing the broad purposes of the invention. For example, the keeper member could be flat or substantially planar if the function of the hitch lock was to be limited to only unattached trailer vehicles. Alternatively, the keeper member could be step-shaped with two substantially right angles provided the web or central section was appropriately dimensioned so as to disable the hitching coupler. It should be understood that this description is intended to illustrate but not to limit the scope of the invention as defined in the following claims.

I claim:

1. A trailer hitch lock for disabling the hitching apparatus at the proximal end of a tongue of a trailer vehicle, comprising:
   (a) an extended ear mounted on the tongue of the trailer vehicle;
   (b) a keeper member reversible top-for-bottom having a base portion with an aperture through which said ear is inserted and having an extended portion projected forwardly of said base portion at an obtuse angle thereto;
   (c) a padlock including a shackle; and
   (d) said ear including a throughbore aperture for receiving the shackle of said padlock.

2. The trailer hitch lock as defined in claim 1 further comprising:
   (a) a shackle guard that is substantially U-shaped in transverse cross section and which includes an aperture in the web portion thereof through which said ear extends when said guard is positioned over said base portion.

3. The hitch lock as defined in claim 2, wherein:
   (a) said shackle guard permits the insertion of said shackle of said padlock when open into said ear aperture and substantially covers said shackle of said padlock when locked.

4. The hitch lock as defined in claim 1, wherein:
   (a) said trailer vehicle is attached to a tractor vehicle; and
   (b) said reversible keeper member is oriented such that said extended portion projects downwardly from said base portion to be adjacent the hitching apparatus to prevent removal of the trailer vehicle from the tractor vehicle.

5. The hitch lock as defined in claim 2, wherein:
   (a) said trailer vehicle is attahced to a tractor vehicle; and
   (b) said reversible keeper member is oriented such that said extended portion projects upwardly from said base portion to be adjacent the hitching apparatus to prevent removal of the trailer vehicle from the tractor vehicle;
(c) the hitching apparatus includes a pintle ring; and
(d) said tractor vehicle has a pintle inserted into said pintle ring, the removal of which is blocked by said extended portion.

6. The hitch lock as defined in claim 2, wherein:
(a) said trailer vehicle is unattached to a tractor vehicle;
(b) the hitching apparatus includes a pintle ring; and
(c) said extended portion blocks the opening of said pintle ring.

7. The hitch hock as defined in claim 4, wherein:
(a) the hitching apparatus includes a socket; and
(b) said tractor vehicle has a towing ball inserted into said socket, the removal of which is blocked by said extended portion.

8. The hitch lock as defined in claim 1, wherein:
(a) said trailer vehicle is unattached to a tractor vehicle;
(b) said reversible keeper member is oriented such that said extended portion projects upwardly from said base portion into the hitching apparatus to prevent the attachment of the trailer vehicle to a tractor vehicle.

9. The hitch lock as defined in claim 8, wherein:
(a) the hitching apparatus includes a socket; and
(b) said extended portion blocks access to said socket.

10. The hitch lock as defined in claim 1, wherein:
(a) said keeper member is adapted to be oriented to a storage position wherein said extended portion projects downwardly toward the rear of the trailer vehicle.

11. A trailer hitch lock for disabling the hitching apparatus near the proximal end of a tongue of a trailer vehicle, comprising:
(a) a downwardly extended ear mounted on the underside of the tongue of the trailer vehicle near its hitching apparatus;
(b) a keeper member having a base portion with an aperture through which said ear is inserted and having an extended portion projected forwardly of said base portion at an obtuse angle;
(c) said keeper member being reversible top-for-bottom between a first position wherein said extended portion extends forwardly and upwardly of said base portion and a second position wherein said extended portion extends forwardly and downwardly of said base portion;
(d) a padlock including a shackle; and
(e) a throughbore aperture of said ear for receiving the shackle of said padlock.

* * * * *